United States Patent Office 3,197,458
Patented July 27, 1965

3,197,458
CUPRIC HYDROGENATED DEXTRAN AND METHOD FOR PREPARING THE SAME
Nicholas A. Fioramo, San Juan, Puerto Rico, assignor to Chemicals Incorporated, Luquillo, Puerto Rico, a Puerto Rican corporation
No Drawing. Filed Aug. 15, 1962, Ser. No. 216,971
4 Claims. (Cl. 260—209)

The present invention is directed to cupric hydrogenated dextran, and to a method for preparing the same.

There has been a long felt need for a stable substantially non-ionic cupric complex. Thus, copper in the cupric state is readily reduced to the cuprous state, normally precipitating out as the familiar red brown cuprous oxide.

This invention has as an object the formation of a stable substantially non-ionic cupric complex.

This invention has as another object the provision of a method for forming such substantially stable non-ionic cupric complexes.

The cupric complexes of the present invention comprise substantially non-ionic complexes of cupric hydroxide and hydrogenated dextran having an average intrinsic viscosity of about 0.03 to 0.30 at 25° C. The cupric complexes of the present invention may be used to detect the presence of reducing groups, such as aldehyde groups in a wide variety of materials. Upon the presence of such groups, the cupric ion in the preparation of the present invention is reduced to the cuprous state with the precipitation of cuprous oxide. Other uses to which the substantially non-ionic colloidal cupric hydrogenated dextran complexes of the present invention may be put are as an agent to prevent the formation of algae in swimming pools, and as a mordant for dyeing and calico printing.

The partially-depolymerized dextran which I use as a starting-material is derived from raw dextran obtained according to known methods by growing under carefully controlled conditions of temperature, appropriate organisms, especially Leuconostoc mesenteroides, syn. Betacoccus arabinosaceous in a suitable nutrient medium containing a high proportion of sucrose. It is further known that the highly polymerized raw dextran gives rise on partial degradation as, for example, by treatment with dilute mineral acid, to simpler polymeric forms from aqueous solutions of which (being polydisperse), fractions of different average molecular weight can be precipitated by adding a suitable water-miscible organic liquid, such as methyl alcohol, ethyl alcohol or acetone. These degradation products consist of polymerized glucose residues, joined predominantly by $\alpha$-1:6 and, to a lesser extent, by $\alpha$-1:4 linkages.

A fraction of this kind is suitable as a starting-material for the purpose of our invention, but the molecular range of the partially depolymerized dextran is selected from the standpoint of the physical characteristics such as intrinsic viscosity, of the solution containing the minimum concentration of the dextran needed to insure continued stability of the non-ionic cupric complex colloidal solution.

In the present context the intended meaning of intrinsic viscosity is the limiting value of specific viscosity divided by concentraton at infinite dilution measured by the following method. The "flow time" of at least three solutions of different concentrations (all less than 5% w./v. dextran) is determined in an Ostwald viscometer. The flow time of the solution divided by the flow time for water at the same temperature, gives the relative viscosity of the dextran solution at the given concentration. The specific viscosity of a dextran solution at a given concentration is obtained by subtracting 1.0 from the value for relative viscosity. For each concentration of dextran solution, the factor (specific viscosity divided by concentration) is calculated and this factor is plotted against the percentage concentration of the solution from which it was obtained. By extrapolating the graph obtained to zero concentration, the limiting value of the factor (specific viscosity divided by concentration) is obtained. This value is known as the intrinsic viscosity of the material in solution. Due to the fact that the fractions of dextran described are polydisperse, the term average intrinsic viscosity is used.

To avoid any possible misinterpretation, the term "average intrinsic viscosity" refers to the dextran itself and not to an aqueous solution of dextran, or an aqueous solution of the cupric hydroxide-hydrogenated dextran complex.

The hydrogenated dextran used in the present invention may be prepared from dextran produced by the aforesaid degradation method, or the hydrogenated dextran may be prepared from dextran produced by an enzymatic synthesis method, such as that generally described in Patent 2,660,551, the disclosure of which is incorporated herein by reference.

As an example for the preparation of hydrogenated dextran from a dextran derived from the degradation of natural dextran, the following is illustrative:

EXAMPLE A 200 grams of sodium borohydride dissolved in water were added to a ten percent aqueous solution containing ten pounds of dextran having an average intrinsic viscosity of 0.05. The mixture was allowed to stand at room temperature for five hours with occasional stirring, and then was acidified with thirty percent acetic acid. The acidified mixture was passed through a column of a cation exchange resin, and the effluent therefrom was passed through a column of an anion exchange resin. Methyl alcohol was added with stirring to the so-deionized solution to give a solution containing eighty percent of methyl alcohol by volume. After standing for 24 hours at 25° C., the supernatant solution was decanted from the precipitated reduced dextran. The product was dried at 100° C. at atmospheric pressure for one hour, then at 100° C. in vacuum for two hours. The product was non-reducing to the Somogyi reagent. It is desirable that premilinary testing be made when dealing with different batches of dextran to determine that an adequate amount of sodium borohydride is present, in the above example the sodium borohydride is present in excess of its minimum requirement.

As a method of preparing hydrogenated dextran of the polymerized type, the following is illustrative:

EXAMPLE B

*Leuconostoc mesenteroides* NRRL B-512 was utilized to produce dextransucrase by the procedure set forth in Example 1 of Patent 2,660,551.

Such dextransucrase was utilized to form polymerized dextran from an aqueous mixture containing 80 weight percent of sucrose and 5 weight percent of low molecular weight dextran derived from a preceding run. The pH of the mixture was adjusted to 5.2 and the temperature was maintained at 25° C. until conversion of sucrose to dextran, as measured by the production of fructose, had ceased.

Dextran was then precipitated from the mixture by the addition of methyl alcohol to give a ninety percent solution. Such gummy precipitate was then made up into a five percent aqueous solution and fractionated by the progressive addition of methyl alcohol, such fractionation including four stages each with an increasing concentration of methyl alcohol, namely a methyl alcohol fractionation within the limits of percent v./v. of 0–40, 40–50, 50–60, and 60–70. The dextran derived from the last two fractionations was of the order of molecular weight for usage in the preparation of the cupric hydroxide-hydrogenated dextran complexes of the present invention.

The dextran derived from the last two fractionations is separated and hydrogenated in accordance with the following procedure: 200 grams of sodium borohydride dissolved in water were added to a ten percent aqueous solution containing ten pounds of the aforesaid dextran. The mixture was allowed to stand at room temperature for five hours with occasional stirring, and then was acidified with thirty percent acetic acid. The acidified mixture was passed through a column of cation exchange resin, and the effluent therefrom was passed through a column of an anion exchange resin.

Methyl alcohol was added with stirring to the so deionized solution to give a solution containing sixty percent of methyl alcohol by volume. After standing for 24 hours at 25° C. the supernatant solution was decanted from the precipitated reduced dextran. The product was dried at 100° C. at atmospheric pressure for one hour, then at 100° C. in vacuum for two hours. The resultant hydrogenated dextran was non-reducing to the Somogyi reagent.

The hydrogenated dextrans used in the subject invention are substantially non-reducing to the Somogyi reagent.

The source of the cupric ions used to prepare the material of the present invention may be any water soluble cupric salt which does not deleteriously affect the hydrogenated dextran used in the present invention. Examples of suitable cupric salts include cupric acetate, cupric chloride, cupric nitrate, cupric sulfate.

The process of the present invention is preferably performed at room temperature. It may be performed at higher temperatures up to a temperature at which degradation of the hydrogenated dextran commences, such as a temperature above about 50° C. in most cases. Degradation of the hydrogenated dextran is to be avoided, since the degradation will produce aldehyde end groups which will reduce the cupric ion to cuprous ion.

A wide variety of aqueous concentrations of hydrogenated dextran having an average intrinsic viscosity of 0.03 to 0.30 may be used, and the aqueous concentration of such hydrogenated dextran is not critical. Generally, up to about fifty weight percent of hydrogenated dextran may be used. Above about fifty weight percent it is difficult to work with the material, as it constitutes a paste rather than a solution. It is normally economically non-feasible to work with solutions of aqueous hydrogenated dextran of below about one weight percent.

The final cupric complex may contain from about one weight percent of copper measured as elemental copper up to about ten weight percent of copper measured as elemental copper.

The substantially non-ionic cupric hydroxide and hydrogenated dextran complex of the present invention is preferably maintained at a pH of about 6.5 to 7.5. Somewhat higher pH values may be used up to about 8.5. However, above this figure, there is a real possibility of degradation of the hydrogenated dextran with the simultaneous formation of aldehyde end groups and reduction of the cupric hydroxide to insoluble cuprous oxide.

The color of the cupric hydrogenated dextran ranges from blue to green, and is typically bluish-green.

Any suitable alkali may be used to form the cupric hydroxide, but for reasons of economy sodium hydroxide is preferred. However, potassium hydroxide may be utilized.

It is my present belief that the complex of the present invention is a substantially non-ionic complex between cupric hydroxide and the hydrogenated dextran. I have established beyond question that the complex is stable on storage for extended periods of time only when hydrogenated dextran is utilized, and that the dextran having the same average intrinsic viscosity as the hydrogenated dextran used in the present invention may not be used. Thus, without exception, there is a rapid precipitation of cuprous oxide when dextran is substituted for the hydrogenated dextran in the process of the present invention. While I do not wish to be bound by any theory, it is my belief that the dextran includes at least one and probably more reducing end groups, probably aldehydes, which result in the reduction of the cupric ion in the complex to cuprous ion, with the simultaneous precipitation of cuprous oxide.

The process of my invention is, as heretofore noted, preferably performed throughout at room temperature, and in any event at a temperature below the degradation temperature of hydrogenated dextran, normally below 50° C. The process is effected under constant agitation.

The process is normally commenced at a pH below 7, and preferably of the order of 4.5 to 6.5. Thus, it is advisable to store hydrogenated dextran and to work with it on the acid side of normal in order to prevent degradation.

The cupric ions are added to the hydrogenated dextran. There is no critical concentration of cupric ions to hydrogenated dextran, and normally the amount which is to be added will depend on considerations relating to the purity of the final product and the economic feasability of re-purifying the same. The amount of cupric ions to be added to the hydrogenated dextran in terms of cupric sulfate hydrate ($CuSO_4 \cdot 5H_2O$) is of the order of 0.1 to 0.5 parts by weight of cupric sulfate hydrate per part by weight of hydrogenated dextran.

After the cupric ions have been added, the hydroxyl ions should be added, such as in the form of one normal sodium hydroxide or one normal potassium hydroxide. The normality of the alkali is not critical, and a wide range of concentrations may be utilized. Generally, in order to avoid degradation of the hydrogenated dextran, the normality should not be above several normal. The pH should be gradually raised to a pH of about 11.5 to 12.5 and preferably of the order of about 12.0. While the pH is raised to this value, I have noted that cupric hydroxide is continuously precipitating. However, when the value reaches approximately 11.5 to 12.5 and normally at about 12.0, the cupric hydroxide precipitate goes into solution. Above a pH of about 12.5, further precipitation of cupric hydroxide is encountered, which is undesirable. Moreover, raising of the pH for protracted periods to high pH values tends to degrade the dextran with resultant precipitation of cuprous oxide.

The cupric hydrogenated dextran complex of the present invention is purified in order to eliminate sodium sulfate (assuming that cupric sulfate and sodium hydroxide were used in the process), and also to eliminate unreacted dextran. The purification may be accomplished by dialysis, or alternatively by a series of precipitations and dissolutions using solvents which do not attack the dextran. Suitable solvents, are low molecular weight alcohols and ketones, such as methanol, ethanol, isopropyl alcohol, acetone, etc. Thus, from one to two parts by weight of alcohol or ketone (the weight percentage of the alcohol or ketone is not in any way critical, and may be greatly varied) is added per part by weight of the cupric hydrogenated dextran complex to precipitate out the complex. The separated precipitated complex may then be redissolved in water and the pH adjusted to 6.5 to 7.5 using hydrochloric acid or other strong mineral acid. Further purification may be effected by precipitating from this solution with further alcohol or ketone, and then redissolving, and if desired reprecipitating and redissolving again.

When the complex has attained the desired degree of purity, it may be dissolved in water and concentrated by vacuum distillation, removing water and residual amounts of alcohol or ketone to yield the desired amount of copper in the final product, which as heretofore indicated is normally of the order of one weight percent, measured as elemental copper, up to ten weight percent, measured as elemental copper.

Shelf testing has revealed that the cupric complex of the present invention is stable so long as there is no degradation of the hydrogenated dextran.

While I believe that the cupric hydrogenated dextran complex of the present invention is a substantially non-ionic colloidal complex, the exact nature of this complex is most difficult to postulate on the basis of present day chemical theory. Thus, it cannot be understood on the basis of present day theory why the cupric hydroxide is maintained in the complex, since the hydrogenated dextran utilized in the complex of the present invention is nonreducing to Somogyi reagent, and the nature of its end groups is not understood.

The compositions of my invention may be purified to the point where they are essentially free from ions, and thus may be classified as non-ionic.

The invention will be illustrated by the following specific examples, but it is not limited thereto. Many different components may be substituted, as above-indicated in the case of the variety of cupric compounds, and alkalies for those set forth in the examples. Furthermore, new sources of cupric compounds, etc. may be developed and made commercially available. It is therefore not only impossible to attempt a comprehensive catalog of useful components, but to attempt to apprehend or describe the invention in its broader aspects in terms of the chemical names of all of the possible components used would be misleading. To formulate a set of specifications for a composition in the light of the present disclosure will call for chemical knowledge and skill, but the office of the chemist will be like that of a mechanical engineer who prescribes in the construction of a machine the proper materials and the proper dimensions therefor. From his knowledge as a chemist of the materials available he will know or deduce with confidence their applicability to the purposes of the invention or, otherwise, and in the case of novel materials, routine tests not of an inventive nature will provide reliable data. I may safely assume that no one will wish to make a useless composition or will be misled because it is possible to misapply the teachings of the present disclosure in order to do so:

*Example I*

0.3 part by weight of cupric sulfate hydrate are added to one part by weight of ten weight percent of aqueous hydrogenated dextran solution having an average intrinsic viscosity of 0.04 at room temperature. The process is conducted under continuous mechanical agitation. The pH is adjusted from an initial pH of 5.0 to a final pH of 12 by the gradual addition of 1 normal sodium hydroxide. During the addition there is a continuous precipitation of cupric hydroxide after the pH exceeds about 7.0 up until the pH of 12.0 is reached. At that time the precipitate goes into solution giving a blue colored solution.

The complex may be purified from this solution by dialysis, or by precipitation and dissolution techniques. Thus, the complex may be precipitated by adding to the solution an equal amount by weight of isopropyl alcohol. This will result in the precipitate of a gummy mass. The gummy mass may be redissolved in water, and the pH adjusted to 6.5–7.5. From this solution a purer precipitate may be precipitated by the addition of an equal amount by weight of isopropyl alcohol. The second precipitate may again be redissolved in water. The solution may be concentrated by the vacuum distillation of water to a 5 weight percent copper, measured as elemental copper, value. The resultant solution will be a bluish-green solution, and will remain as such when stored at a pH of 6.5–7.5.

*Example II*

Hydrogenated dextran was prepared by the procedure set forth in Example B, and then the procedure set forth in Example I was followed except that the hydrogenated dextran from Example B was substituted for the hydrogenated dextran from Example A.

*Example III*

0.5 part by weight of cupric chloride hydrate $$(CuCl_2 \cdot 2H_2O)$$

were added to 1 part by weight of 20 weight percent of aqueous hydrogenated dextran solution prepared pursuant to Example A. The pH is adjusted with 0.5 normal potassium hydroxide from an initial pH of 5.0 to a pH of 12.2 with constant stirring. During the addition of the sodium hydroxide cupric hydroxide precipitates from the solution, but the cupric hydroxide dissolved at the pH of 12.2.

The cupric hydrogenated dextran complex is precipitated using acetone, and the precipitate is purified by dialysis, and then dissolved in water, and the pH of the solution adjusted to a pH of 6.8. The solution is then vacuum distilled to produce a final product containing 3.0 weight percent of copper, measured as elemental copper.

*Example IV*

The process of Example III is repeated except that in place of the hydrogenated dextran from Example A there was substituted hydrogenated dextran from Example B.

*Example V*

0.1 part by weight of cupric nitrate hydrate $$(Cu(NO_3)_2 \cdot 3H_2O)$$

are added to 1 part by weight of 5 weight percent aqueous hydrogenated dextran solution of the type heretofore described in Example B. The procedure of Example I is then followed. It is found that if the pH is pushed appreciably above 12.5, such as to about 13, there is a deposition of cupric hydroxide after the initial dissolution of the cupric hydrogenated dextran complex, giving an added impurity and purification problem.

*Example VI*

The procedure of Example III is repeated except that the cupric salt is cupric sulfate hydrate, and the pH is raised to 11.7.

The compositions of the present invention may be admixed with a wide variety of materials, so long as the materials do not contain substances which reduce the cupric ion to cuprous ion.

The present invention may be embodied in other specific forms without departing from the spirit or essential attributes thereof and, accordingly, reference should be made to the appended claims, rather than to the foregoing specification as indicating the scope of the invention.

I claim:

1. A substantially non-ionic complex, which is stable on contact with water, of cupric hydroxide and hydrogenated dextran, said hydrogenated dextran having an intrinsic viscosity of 0.03 to 0.30 at 25° C., and said complex containing from 1 to 10 weight percent of copper, measured as elemental copper.

2. An aqueous solution of the complex of claim 1 having a pH of between 6.5 and 7.5.

3. A substantially non-ionic complex in accordance with claim 1 in which the hydrogenated dextran is derived from the degradation of a high molecular weight dextran.

4. A substantially non-ionic complex in accordance with claim 1 in which the hydrogenated dextran is derived from the synthetical polymerization of a dextran.

References Cited by the Examiner

UNITED STATES PATENTS

| | | | |
|---|---|---|---|
| 2,853,414 | 9/58 | Wimmer | 260—209 XR |
| 3,022,221 | 2/62 | Floramo | 260—209 |
| 3,074,927 | 1/63 | Saltman | 260—209 |

LEWIS GOTTS, *Primary Examiner.*

CHARLES B. PARKER, *Examiner.*